M. M. BOWERS,

Assignor, by mesne assignments, to HIMSELF, T. M. HILTZHIMER, JR., & E. D. UTTER, Executor.

Reversible Plow-Point.

No. 9,236. Reissued June 8, 1880.

*Witnesses:*

H. N. Low.

J. S. Barker.

*Inventor:*

Marcus M. Bowers by W. H. Doubleday atty

N. PETERS, PHOTO-LITHOGRAPHER, WASHINGTON, D. C.

UNITED STATES PATENT OFFICE.

MARCUS M. BOWERS, OF RICHMOND, VIRGINIA, ASSIGNOR, BY MESNE ASSIGNMENTS, TO HIMSELF, THOMAS M. HILTZHIMER, JR., AND EDWARD D. UTTER, EXECUTOR.

REVERSIBLE PLOW-POINT.

SPECIFICATION forming part of Reissued Letters Patent No. 9,236, dated June 8, 1880.

Original No. 165,703, dated July 20, 1875. Reissue No. 7,894, dated September 25, 1877. Application for reissue filed April 6, 1880.

*To all whom it may concern:*

Be it known that I, MARCUS M. BOWERS, of Richmond, in the county of Henrico and State of Virginia, have invented certain new and useful Improvements in Reversible Plow-Points; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to reversible plow-points; and it consists, first, in providing the forward end of the plowshare with a central opening which extends vertically through the same, and formed to receive the shank of a plow-point; second, in a detachable and reversible plow-point having lips upon the upper and lower edges of its shank, in combination with a plowshare in which is a central opening formed to receive said shank; third, in a wedge-shaped plow-point with its shank and the opening which receives said shank, when so constructed that its sides may be reversed and yet always occupy the same relative position to the share; fourth, in a plow-point having lips and dovetailed offsets upon its sides to fit the suitably-constructed forward end of a plowshare, and in other features which will be explained.

Figure 1:
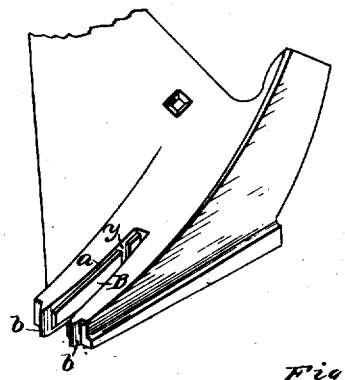
Figure 3:
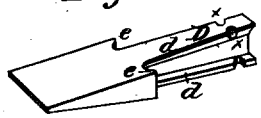
Figure 4:
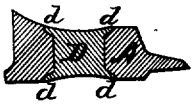
Figure 2:
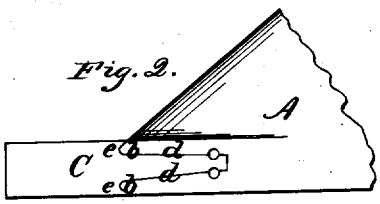

In the annexed drawings, Figure 1 is a perspective view of a plowshare with point detached. Fig. 2 is a plan view of the same with the point in place.

A represents the plowshare, in the forward end of which is formed a central opening or socket, B, made vertically through the share, and which may be made tapering, as shown in the drawings, or may have parallel sides, if so desired.

The upper and lower edges of the socket or opening B, on both sides, are beveled off, as shown at *a a*, and at the front end are bevels *b b*, one on each side of the opening.

C is the point, made with a shank, D, of such shape and size as to fit into the socket or opening B; and said shank is formed with lips *d* on both sides, at the upper and lower edges, to fit into the bevels *a* of the socket, and thus keep the point C in line. The point C is also made with inclined shoulders *e e* upon its sides, at the base of the shank, to fit upon the bevels *b* of the end of the share A. These inclined shoulders *e* prevent the parts of the share upon the sides of the socket from spreading and making the point loose.

The point C, with its shank, is made exactly alike upon the upper and lower sides—that is to say, if the point were divided centrally by a line running from the extreme front edge to the center of the shank at the rear end the two parts would be exactly alike, and hence the point will have the same line and set, whichever side may be up.

These points may be cast or forged, as may be desired; and the sockets in the shares may be cast therein by using the ordinary share-patterns, and inserting a pattern of the point in the point of the mold and casting the share upon it, the said patterns being afterward knocked out.

On one or both sides of the shank D a notch, *x*, is made in the lips *d*, and a corresponding notch, *y*, is made in one or both sides of the socket B, so that the point may, if desired, be locked in place by driving a pin or a piece of a nail into said notches. When the point is first inserted the notches *x* and *y* do not exactly coincide, but assume the appearance as shown in Fig. 2. When the pin or nail is then driven in the point is drawn up into the socket and locked in place.

I am aware that the patent to G. A. Walker, March 12, 1861, shows a plowshare with a socket, the horizontal faces of which and the corresponding faces of the plow-point shank interlock; but he shows no key or key-seat, whereas in my construction the key interposed between the adjacent side faces of the shank and the plowshare-socket perfoms an important function in maintaining said point in proper working relation.

Having thus fully described my invention, what I claim as new, and desire to secure by Letters Patent, is—

1. A plowshare having its forward end slotted vertically entirely through, and the sides or walls of said slot converging from the base at equal angles on top and bottom, the lines meeting at the plow-point and diverging from the base on either side, to form a wedge-shaped opening for the plow-point, as set forth.

2. A plow-point in the form of an equal-sided wedge, in combination with a plowshare having its forward end slotted vertically entirely through, and the sides or walls of said slot converging from the base at equal angles on top and bottom, the lines meeting at the plow-point and diverging from the base on either side, to form a wedge-shaped opening for the plow-point, as set forth.

3. An equal-sided wedge-shaped plow-point, as described, in combination with the plowshare having a central opening passing vertically entirely through the same, said plow-point being provided with a shank which is securely retained in the opening in the share both laterally and vertically, independent of external fastenings, as and for the purposes set forth.

4. A detachable and reversible plow-point, C, with lips upon the upper and lower edges of its shank, in combination with a plowshare in which is a central opening formed to receive said shank, as and for the purpose set forth.

5. A plowshare having its front end slotted vertically entirely through, and having a side face of the socket thus formed constructed to receive and interlock with a correspondingly-shaped side face of the shank of a plow-point, substantially as set forth.

6. A plow-point having a supporting-shank constructed with a substantially vertical side face adapted to interlock with a correspondingly-shaped side face of a socket formed in the front end of a plowshare and provided with a vertical key-seat to receive a key interposed between two adjacent side faces of the shank, and adapted to press the interlocking faces tightly together, substantially as set forth.

7. A plowshare having a socket constructed with a substantially vertical interlocking side face, in combination with a plow-point provided with a shank having a side face adapted to interlock with the side face of said socket, and a vertical key-seat adapted to receive a key between the side wall of the shank and the side wall of the socket, substantially as set forth.

In testimony that I claim the foregoing I have hereunto set my hand this 6th day of December, 1879.

MARCUS M. BOWERS.

Witnesses:
T. M. HILTZHIMER, Jr.,
HARRY TOMPSON.